United States Patent
Menold et al.

(10) Patent No.: US 12,537,472 B2
(45) Date of Patent: Jan. 27, 2026

(54) HYDRAULIC LOAD MANAGEMENT FOR ELECTRIC MOTOR DRIVEN SYSTEMS

(71) Applicant: Caterpillar Inc., Peoria, IL (US)

(72) Inventors: Rodney L. Menold, Hanna City, IL (US); Cameron T. Lane, Oro Valley, AZ (US); Andrew Olson, Vail, AZ (US); Karl P. Schneider, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/739,054

(22) Filed: Jun. 10, 2024

(65) Prior Publication Data
US 2025/0379538 A1    Dec. 11, 2025

(51) Int. Cl.
*H02P 29/024*    (2016.01)
*F04B 17/03*    (2006.01)
(Continued)

(52) U.S. Cl.
CPC ............ *H02P 29/026* (2013.01); *F04B 17/03* (2013.01); *F15B 15/18* (2013.01); *G01R 31/382* (2019.01);
(Continued)

(58) Field of Classification Search
CPC ........ H02P 29/026; H02P 29/40; F04B 17/03; F15B 15/18; F15B 2211/75; F15B 2211/755; F15B 2211/76; G01R 31/382
See application file for complete search history.

(56) References Cited

U.S. PATENT DOCUMENTS

| | | |
|---|---|---|
| 8,087,240 B2 | 1/2012 | Morinaga et al. |
| 8,744,654 B2 | 6/2014 | Wu |

(Continued)

FOREIGN PATENT DOCUMENTS

| | | | |
|---|---|---|---|
| JP | 2013160018 A | * | 8/2013 |
| JP | 2023139405 A | | 10/2023 |

(Continued)

OTHER PUBLICATIONS

Written Opinion and International Search Report for Int'l. Patent Appln. No. PCT/US2025/031334, mailed Aug. 29, 2025 (13 pgs).

*Primary Examiner* — Audrey B. Walter
(74) *Attorney, Agent, or Firm* — von Briesen & Roper, s.c.

(57) ABSTRACT

Hydraulic load management for electric motor driven systems, such as hydraulic systems in a work machine, is disclosed. The hydraulic system may include an electric motor coupled to a hydraulic pump to provide hydraulic fluid to a hydraulic actuator, and a power bus may connect an electric power source to the electric motor. Hydraulic load management may include determining an actual electric power available at the electric power source, comparing the actual electric power to a threshold electric power for operating the electric motor at a full capacity, and setting a value for an available electric power and a current power curve for the electric motor corresponding to the available electric power. When hydraulic system input is detected, electric power is provided via the power bus, and the electric motor is operated at a motor speed based on the current power curve and a commanded speed from the hydraulic system input.

16 Claims, 4 Drawing Sheets

(51) Int. Cl.
*F15B 15/18* (2006.01)
*G01R 31/382* (2019.01)
*H02P 29/40* (2016.01)

(52) U.S. Cl.
CPC ........... *H02P 29/40* (2016.02); *F15B 2211/75* (2013.01); *F15B 2211/755* (2013.01); *F15B 2211/76* (2013.01)

(56) References Cited

U.S. PATENT DOCUMENTS

| | | |
|---|---|---|
| 8,793,023 B2 | 7/2014 | Vanderlaan et al. |
| 10,280,592 B2 | 5/2019 | Takahashi et al. |
| 11,668,255 B2 | 6/2023 | Nair et al. |
| 2011/0208363 A1 | 8/2011 | Vanderlaan et al. |
| 2018/0112726 A1* | 4/2018 | Sparks .................... F16D 7/027 |
| 2018/0238018 A1* | 8/2018 | Ishihara ................ E02F 9/2075 |
| 2023/0104698 A1 | 4/2023 | Young |
| 2023/0136614 A1 | 5/2023 | Lane |
| 2023/0391225 A1 | 12/2023 | Lane et al. |

FOREIGN PATENT DOCUMENTS

| | | |
|---|---|---|
| KR | 20180078990 A | 7/2018 |
| WO | 2014084213 A1 | 6/2014 |

\* cited by examiner

HYDRAULIC LOAD MANAGEMENT FOR ELECTRIC MOTOR DRIVEN SYSTEMS

TECHNICAL FIELD

The present disclosure relates generally to electric motor driven hydraulic systems and, more particularly, to hydraulic load management for electric motor driven systems.

BACKGROUND

Hydraulic systems are widely used in industrial and mobile machinery applications due to their ability to provide substantial force and precise control over motion. Traditional hydraulic systems often rely on internal combustion engines to drive hydraulic pumps, which generate pressurized fluid to actuate hydraulic cylinders and motors. However, the increasing need for energy efficiency, environmental sustainability, and operational flexibility has driven the development and adoption of electric power sources for hydraulic systems.

Electric motors, powered by electrical energy sources such as batteries or grid electricity, are becoming increasingly popular for driving hydraulic pumps. These electric-driven hydraulic systems offer several advantages over their combustion engine counterparts. Electric motors provide higher energy efficiency and lower emissions, contributing to a reduction in the carbon footprint of machinery. Additionally, they offer precise control and variability in speed and torque, enhancing the performance and adaptability of hydraulic systems in various applications.

In typical configurations, an electric motor is coupled to a hydraulic pump, converting electrical energy into hydraulic energy by pressurizing the hydraulic fluid. This pressurized fluid is then directed to hydraulic actuators, such as cylinders and motors, which perform the desired mechanical work. A controller receives signals from an input device operated by the machine's operator. The operator's input dictates the function to be performed by the actuator. The controller responds to this input by commanding the electric motor to operate at a specified speed, drawing the necessary power from the electric power source.

One significant challenge in such systems is that the power command from the operator input or from a remote control system transmitted to an autonomous or semi-autonomous work machine may exceed the power available from the electric power source. This scenario can occur when the power supply is below capacity due to conditions such as power being drained by the operation of the work machine or damage to the power supply. If the controller attempts to operate the motor at the commanded power level under these conditions, it can lead to an under-voltage condition and a collapse of the power bus. This instability in the power system can potentially result in system shutdowns or damage to components. Therefore, it may still be necessary to perform the commanded function without causing a bus collapse, necessitating effective management of power demands and supply to maintain the reliability and efficiency of electrically powered hydraulic systems.

SUMMARY OF THE DISCLOSURE

In one aspect of the present disclosure, a work machine is disclosed. The work machine may include a hydraulic pump, an electric motor operatively coupled to the hydraulic pump, an electric power source, a power bus connecting the electric power source to the electric motor to transmit electric power from the electric power source to the electric motor, and a controller operatively connected to the electric motor and the electric power source. The controller may be configured to determine an actual electric power stored at the electric power source, compare the actual electric power to a threshold electric power, and set a value for an available electric power for the electric power source based on the comparison of the actual electric power to the threshold electric power.

In another aspect of the present disclosure, a method for hydraulic load management of an electric motor driven hydraulic system of a work machine is disclosed. The hydraulic system may include a hydraulic pump operatively coupled to the electric motor, and a power bus may connect an electric power source of the work machine to the electric motor to transmit electric power from the electric power source to the electric motor. The method may include determining an actual electric power stored at the electric power source, comparing the actual electric power to a threshold electric power for operating the electric motor at a full capacity, and setting a value for an available electric power for the electric power source based on the comparison of the actual electric power to the threshold electric power.

In a further aspect of the present disclosure, a controller for a work machine having a hydraulic system including a hydraulic pump, an electric motor operatively coupled to the hydraulic pump, and a hydraulic actuator fluidly connected to the hydraulic pump is disclosed. The work machine may further include an electric power source and a power bus connecting the electric power source to the electric motor to transmit electric power from the electric power source to the electric motor. Controller may be configured to determine an actual electric power stored at the electric power source, compare the actual electric power to a threshold electric power, set a value for an available electric power for the electric power source based on the comparison of the actual electric power to the threshold electric power, and set a current power curve based on the value of the available electric power. The controller may further be configured to detect a hydraulic system input to actuate the hydraulic actuator, wherein the hydraulic system input comprises a commanded speed, cause the electric power source to transmit electric power to the electric motor via the power bus, determine a motor speed for the electric motor based on the current power curve and the commanded speed, and cause the electric motor to operate at the determined motor speed. Additional aspects are defined by the claims of this patent.

DETAILED DESCRIPTION

Figure 1:
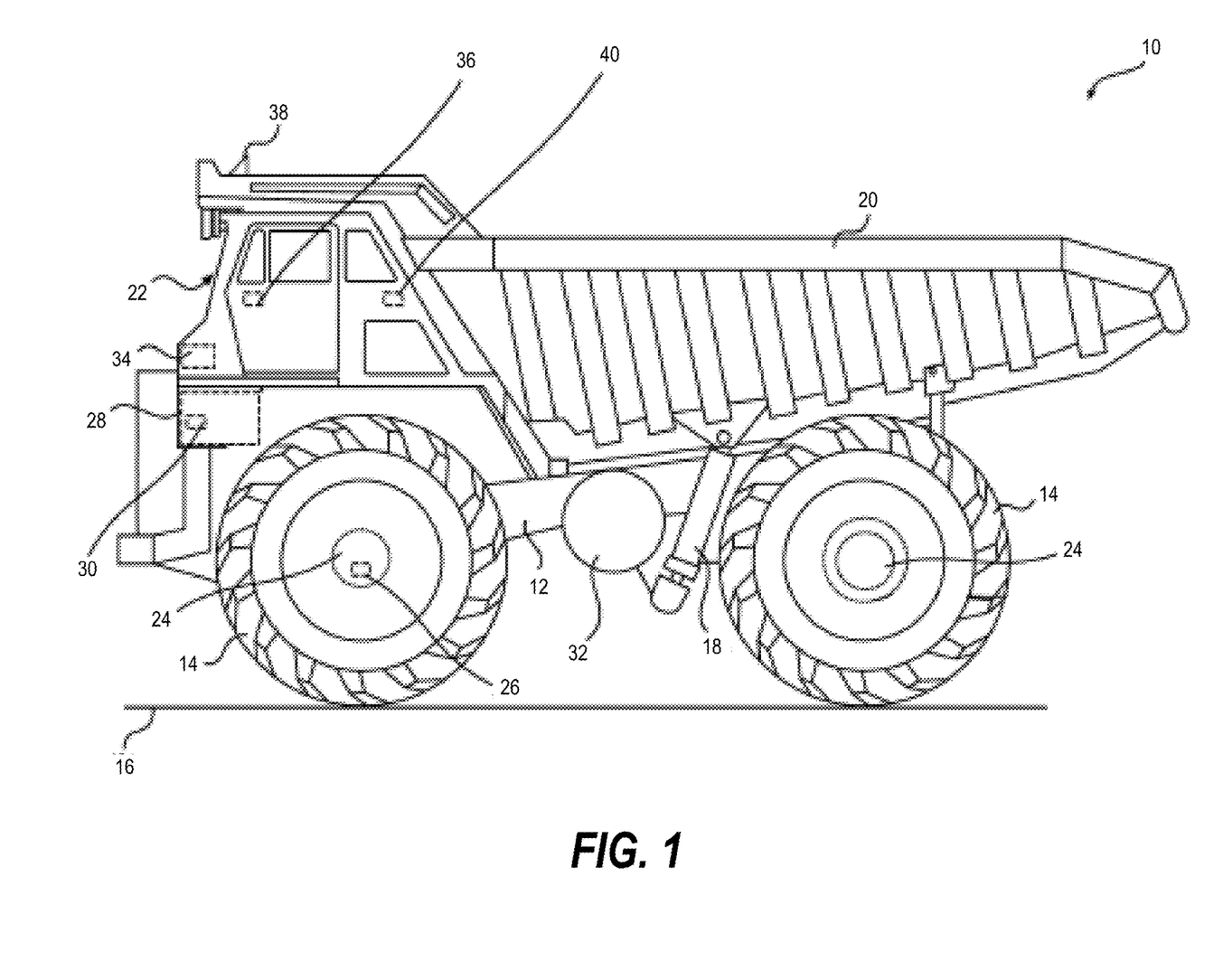
FIG. 1 is a side view of a work machine in the form of a mining truck in which hydraulic load management in accordance with the present disclosure may be implemented.

FIG. 1 is a schematic illustration of a work machine 10 in which hydraulic load management in accordance with the present disclosure may be implemented. The work machine 10, although depicted as a mining truck type of machine, may be any suitable machine, such as any type of loader, dozer, dump truck, skid loader, excavator, backhoe, combine, crane, drilling equipment, trencher, tractor, any suitable stationary machine, any variety of generator, locomotive, marine engines, combinations thereof, or the like, in which an electric motor driven hydraulic system may be implemented. As shown in FIG. 1, the work machine 10 includes a frame 12 and wheels 14. The wheels 14 are mechanically coupled to a drive train (not shown) to propel the work machine 10 over a work surface 16. When the wheels 14 of the work machine 10 are caused to rotate, the work machine 10 traverses the ground 16. Although illustrated in FIG. 1 as having a hub with a rubber tire, in other examples, the wheels 14 may instead be in the form of drums, chain drives, combinations thereof, or the like. The frame 12 of the work machine 10 is constructed from any suitable materials, such as iron, steel, aluminum, other metals, ceramics, plastics, the combination thereof, or the like. The frame 12 may be of a unibody construction in some implementations, and in other implementations may be constructed by joining two or more separate body pieces by an articulated joint.

The work machine 10 may include a hydraulic system 18 that provides power to move a dump box 20 or other moveable elements of the work machine 10 that are configured to move, lift, carry, and/or dump materials, or to perform other functions of the work machine 10. The dump box 20 may be used, for example, to pick up and carry dirt or mined ore from one location on the work surface 16 to another location of the work surface 16. The dump box 20 may be raised and lowered by the hydraulic system 18 to empty a payload that has been deposited by another work machine, or to provide access to components of the work machine 10 for inspection and maintenance. For purposes of the present disclosure, the hydraulic system 18 may be powered by an electric motor powering a hydraulic pump(s) to provide pressurized fluid to move the dump box 20 as discussed further below.

With continued reference to FIG. 1, the work machine 10 may also include an operator station 22. The operator station 22 is configured to seat an operator (not shown) therein. The operator seated in the operator station 22 interacts with various control interfaces and/or actuators within the operator station 22 to control movement of various components of the work machine 10 and/or the overall movement of the work machine 10 itself. Thus, control interfaces and/or actuators within the operator station 22 allow the control of the propulsion of the work machine 10 by controlling operation of one or more propulsion motors 24 to drive the wheels 14, and the control of other motors of the work machine 10, such as a motor (not shown) for the hydraulic system 18 as discussed further below. The motors will be referred to collectively as motors 24. A motor controller 26 may be controlled according to operator inputs received at the operator station 22 and control the operation of the motors 24 in response.

The motors 24 may be powered by an electric power source 28, such as a battery pack or battery, having a power source controller 30. The motors 24 may be of any suitable type, such as induction motors, permanent magnet motors, switched reluctance (SR) motors, combinations thereof, or the like. The motors 24 are of any suitable voltage, current, and/or power rating. The motor controller 26 may include one or more control electronics to control the operation of the motors 24. In some cases, each motor 24 may be controlled by its own motor controller 26. In other cases, all the motors 24 of the work machine 10 may be controlled by a single motor controller 26. The motors 24 may be mechanically coupled to a variety of drive train components, such as a drive shaft and/or axles or directly to the wheels 14 to rotate the wheels 14 and propel the work machine 10, or directly or indirectly to pumps and/or other auxiliary components to operate other systems of the work machine 10 such as the hydraulic systems 18. The work machine 10 may further optionally include a supplementary power source, such as an internal combustion engine (not shown), and have a fuel tank 32 to store an appropriate fuel, such as diesel, gasoline, or other hydrocarbon fuels. The supplementary power source may serve as a backup power source in the event of a failure of the electric power source 28, may provide power to charge the electric power source 28 when an external charging source is unavailable, or may function as a primary power source for some systems of the work machine 10.

The electric power source 28 may be of any suitable type and capacity. For example, the battery may be a lithium ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like. The electric power source 28 may be organized as a collection of electrochemical cells arranged to provide the voltage, current, and/or power requirements of the motors 24. In some implementations, the energy capacity of the electric power source 28 may be a threshold amount more than the energy required for the work machine 10 to traverse a specified distance over the work surface 16 or to perform work for a specified period of time. For example, if a particular work machine 10 is prescribed to have an operating range of 50 kilometers (km), the electric power source 28 of the work machine 10 may be designed to have sufficient capacity to propel the work machine 10 for 75 km. Alternatively, if the work machine 10 is prescribed to operate for 10 hours before being taken out of service, the electric power source 28 may be designed to have sufficient capacity to operate the work machine 10 for 13 hours. A ratio of the energy capacity of the electric power source 28 to the energy need to perform required operations may be any suitable value to provide a desired margin of excess capacity to ensure completion of the operations under normal operating conditions.

The work machine 10 may include a main controller 34 that controls various operational aspects of the work machine 10. The main controller 34 may configured to receive electric power source status (e.g., state-of-charge (SOC) or other charge related metrics) from the power source controller 30, operator signal(s), such as an accelerator signal or dump lift signal, based at least in part on the operator's interactions with one or more control interfaces and/or actuators 36 in the operator station 22 of the work machine 10. In other implementations, the main controller 34 may receive control signals from a remote control system by wireless signals received via an antenna 38. The main controller 34 may use the operator signal(s), regardless of whether they are received from an operator in the operator station 22 or via the antenna 38, to generate command signals to control various components of the work machine 10. For example, the main controller 34 may control the motors 24 via the motor controller 26, the hydraulic system 18, and/or steering of the work machine 10 via a steering controller 40. It should be understood that the main controller 34 may control any variety of other subsystems of the work machine 10 that are not explicitly discussed here to provide the work machine 10 with the operational capability discussed herein.

Those skilled in the art will understand that the functionality for monitoring and operating the work machine 10 being distributed across multiple controllers such as the controllers 26, 30, 34, 40, for example, is exemplary, and alterative control structure architectures are possible. The controllers 26, 30, 34, 40 may be physically separate devices. Alternatively, some or all of the control functions of the controllers 26, 30, 34, 40 described herein may be implemented fewer control devices if necessary based on the requirements and constraints for a particular work machine 10. Where control strategies are discussed in this description and the claims, unless otherwise specified, implementation of the control strategies in a single control device or by distribution across multiple control devices is contemplated by the inventors as having use in implementing hydraulic load management in accordance with the present disclosure.

Figure 2:
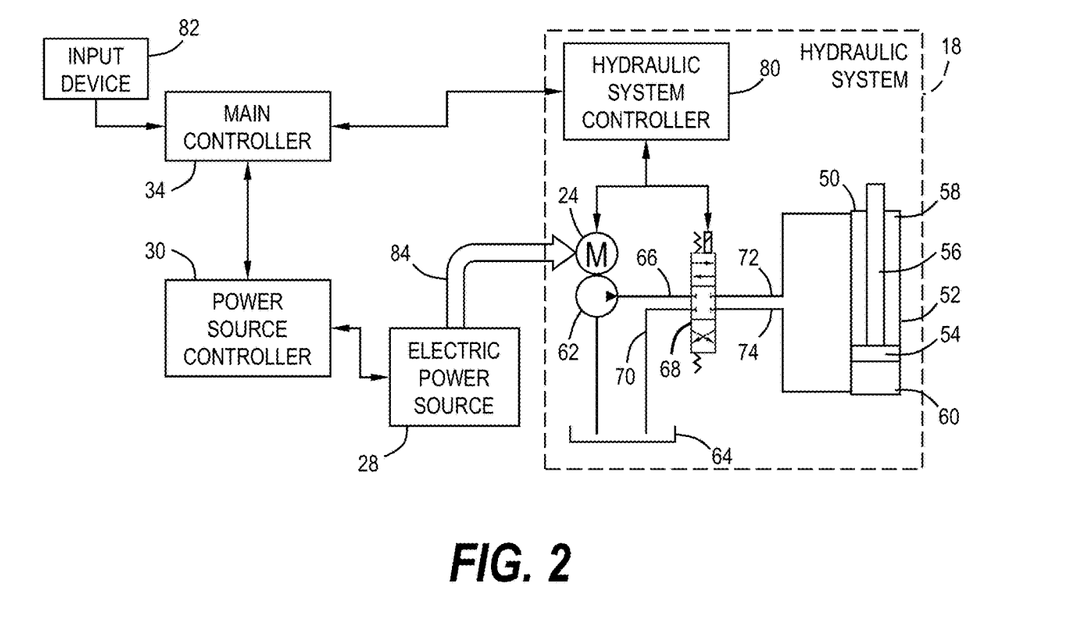
FIG. 2 is a schematic diagram of a hydraulic system of the work machine of FIG. 1 for which hydraulic load management in accordance with the present disclosure may be implemented.

FIG. 2 illustrates an exemplary hydraulic system 18 for the dump box 20 that may be operatively connected to the main controller 34 and the electric power source 28 to be actuated to raise and lower the dump box 20 based on commands from the operator station 22 or from a remote control system via the antenna 38. The hydraulic system 18 may include a hydraulic actuator 50, such as a hydraulic cylinder as shown schematically, that acts to raise and lower the dump box 20. The hydraulic cylinder 50 may include a cylindrical housing 52 enclosing a piston head 54 and a piston rod 56 that is coupled to the piston head 54 and extending out of a rod end 58 of the housing 52 opposite a head end 60. The head end 60 of the cylinder 50 may be mounted on the frame 12, and the end of the piston rod 56 extending from the housing 52 may be connected to the dump box 20. With this arrangement and pivotal connection of the dump box 20 to the frame 12, the cylinder 50 may raise the dump box 20 when the piston rod 56 extends from the housing 52, and lower the dump box 20 when the piston rod 56 is retracted into the housing 52. The single stage hydraulic cylinder illustrated and describe herein is exemplary of hydraulic actuators 50 that may be implemented in the hydraulic system 18. Alternative hydraulic actuators 50 could include multiple stage designs with multiple rods to achieve longer range of motion, including dual stage cylinders and triple stage cylinders, or other hydraulic actuators that use hydraulic power to facilitate mechanical operation.

The hydraulic system 18 may further include an electric motor 24 of the type described above, and a hydraulic pump 62 to provide hydraulic fluid to the hydraulic actuator 50 by drawing hydraulic fluid a low pressure hydraulic fluid reservoir 64 and outputting the hydraulic at high pressure. The pump 62 may be a fixed displacement pump, a variable displacement pump or any other type of fluid pump as may be required for the hydraulic system 18. In embodiments, the hydraulic pump 62 may be a fixed displacement pump that operates at a fixed pressure and high torque when the motor 24 is actuated. The motor 24 may be operatively coupled to the pump 62 and operable to drive the pump 62 to draw fluid from the reservoir 64 and output pressurized fluid via a fluid supply line 66 to an inlet port of a flow control valve 68. A drain line 70 may fluidly connect a drain port of the flow control valve 68 to the low pressure reservoir 64. A first outlet port of the flow control valve 68 may be fluidly connected at the rod end 58 to the hydraulic actuator 50 by a first output fluid line 72, and a second outlet port of the flow control valve 68 may be fluidly connected at the head end 60 of the hydraulic actuator 50 by a second output line 74. The flow control valve 68 may be a solenoid operated 3-position valve and have a close position where fluid flow between the lines 66, 70, 72, 74 is prevented. In an actuator extend position, the flow control valve 68 may place the pump 62 in fluid communication with the head end 60 and the rod end 58 in fluid communication with the low pressure reservoir 64 to extend the piston rod 56 and raise the dump box 20. In an actuator retract position, the flow control valve 68 may place the pump 62 in fluid communication with the rod end 58 and the head end 60 in fluid communication with the low pressure reservoir 64 to retract the piston rod 56 and lower the dump box 20. This arrangement of hydraulic components is exemplary for purposes of the present discussion, but those skilled in the art will understand that additional and alternative flow control elements may be added to the hydraulic system 18 to manage the movement of the hydraulic actuator 50 and address issues such as surge, cavitation and the like within the hydraulic system 18.

The hydraulic system 18 may further include a hydraulic system controller 80 that may be similar to the motor controllers 26 described above while also being configured to control the position of the flow control valve 68 to regulate fluid flow to and from the hydraulic actuator 50. The hydraulic system controller 80 may be operatively connected to the motor 24 and a solenoid of the fluid control valve 68. The hydraulic system controller 80 may output motor control signals to the motor 24 to control the speed and, correspondingly, the power output of the motor 24. The hydraulic system controller 80 may also output valve control signals to the flow control valve 68 to control the position of the flow control valve 68. Depending on the flow control strategy implemented in the hydraulic system 18, the hydraulic system controller 80 may receive sensor signals from devices such as a speed sensor (not shown) providing speed sensor signals corresponding to a rotational speed of a shaft of the motor 24, and position sensors (not shown) providing position sensor signals corresponding to the position of a spool of the flow control valve 68 and the position of the piston rod 56.

The hydraulic system controller 80 will cause the hydraulic system 18 to operate in response to control signals from the main controller 34 generated in response to inputs from an operator and/or a remote control system. The main controller 34 may be operatively connected to the hydraulic system controller 80 to transmit hydraulic system control signals to, and receive hydraulic system feedback signals from the hydraulic system controller 80. In the illustrated embodiment, an input device 82, such as a joystick, may be one of the control interfaces 36 for the operator in the operator station 22 that is operatively connected to the main controller 34 that allows the operator to provide input for the hydraulic system 18 to raise and lower the dump box 20. The operator may move the input device 82 to indicate a commanded direction of movement for the dump box 20 (i.e., raise or lower), and a commanded speed with which to move the dump box 20 (e.g., displacement of the input device 82 is proportional to the commanded speed). A sensor of the input device 82 may detect displacement of the input device 82 and transmit corresponding input signals to the main controller 34 indicating the commanded direction and speed. The main controller 34 may respond by transmitting corresponding hydraulic system control signals to the hydraulic system controller 80. In response, the hydraulic system controller 80 may transmit motor control signals to the motor 24 to operate at a motor speed corresponding to the commanded speed, and transmit valve control signals to the flow control valve 68 to move to the actuator retract position or the actuator extend position that corresponds to the commanded direction to move the dump box 20.

Electric power for the hydraulic system 18 may be provided by the electric power source 28. The electric power may be transmitted from the electric power source 28 to the electrical components of the hydraulic system 18, such as the motor 24 and the solenoid of the flow control valve 68, as well as other components and systems of the work machine 10, via a power bus 84. The electric power controller 30 may operatively connected to the electric power source, and monitor and control the electric power source 28 to distribute power within the work machine 10. The power source controller 30 may be operatively connected to the main controller 34 to receive control signals regarding power needs within the work machine 10, and to provide information to the main controller 34 regarding the operational status of the electric power source 28. With regard to operation of the hydraulic system 18 in particular, upon receiving the input signals from the input device 82 to move the dump box 20, the main controller 34 may transmit power command signals to the power source controller 30 to provide power to the hydraulic system 18 over the power bus 84. The power source controller 30 may respond by causing the electric power source 28 to route power through the power bus 84 to the components of the hydraulic system 18. The power source controller 30 may also receive sensor signals from sensors monitoring the charge level of the electric power source 28, and periodically transmit power source charge level signals to the main controller 34 that may be received and stored for use by the main controller 34 as discussed further hereinafter.

Figure 3:
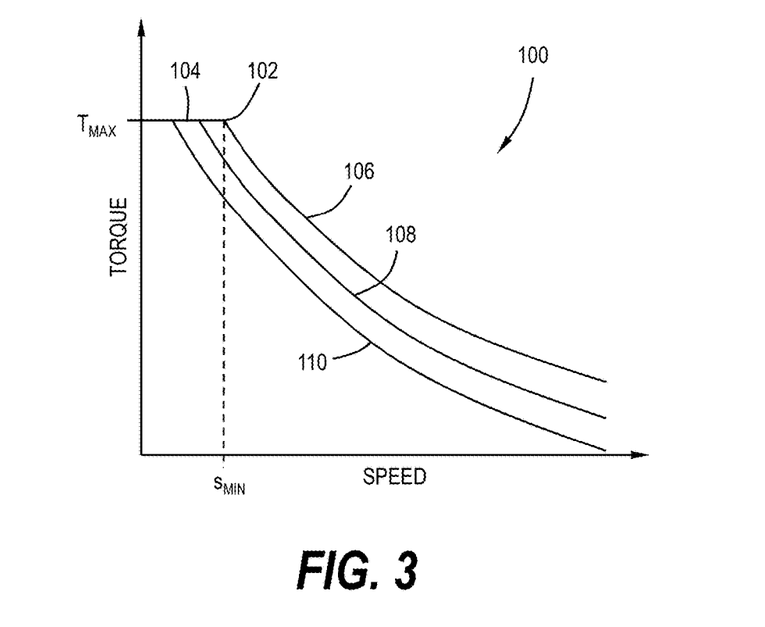
FIG. 3 is a graph of torque versus speed for an electric motor of the hydraulic system of FIG. 2.

Under normal operating conditions where the electric power source 28 has sufficient electric power to meet the needs of the work machine 10, the hydraulic system controller 80 may operate the motor 24 as designed so that the actual speed with which the hydraulic system moves the hydraulic actuator 50 and the dump box 20 corresponds to the speed commanded by the operator at the input device 82. FIG. 3 illustrates an exemplary graph 100 of torque versus speed for an electric motor such as the motor 24. A line 102 represents a power curve for the motor 24 operating when supplied with sufficient electric power to perform commanded functions. In an initial low speed portion 104 of the power curve 102, the motor 24 operates at a maximum torque $T_{MAX}$ for low motor speeds up to a minimum motor speed $S_{MIN}$. In the region 104, the power output by the motor 24 increases linearly as the speed increases. Above the minimum speed $S_{MIN}$, the power curve enters a constant power region 106 where the motor torque decreases as the motor speed increases to maintain an approximately constant power output to avoid exceeding the input electric power from the power bus 84 and risking collapse of the bus 84 due to the excess demand.

During the life of the work machine 10, there may be periods where the electric power source 28 does not have sufficient power to meet the full commanded requirements from devices and systems such as the hydraulic system 18. These under powered situations may exist in instances such as when the work machine 10 has been used for an extended period of time and power has been discharged through use, or where the electric power source 28 has been damaged and cannot carry a full charge. Even though the electric power source 28 may not be able to meet the full requirements for performing operations as commanded, it may still be necessary to perform the commanded functions at a reduced capacity. For example, it may be required to raise the dump box 20 when the work machine 10 reaches a maintenance area to provide access to components under the dump box 20 that require inspection and maintenance. The speed with which the dump box 20 is raised may not be important as long as the dump box 20 is able to be raised.

To perform the required operations with the power available, it may be necessary to adjust the power curve 102 for devices such as the motor 24 to match the available power and operate without collapsing the power bus 84. For example, an adjusted power curve 108 may represent operating conditions for the motor 24, such as 75% capacity, that will not exceed the power available from the electric power source 28. The adjusted power curve 108 is shifted down and to the left from the full power curved 102 so that, for a given motor torque, the motor speed is reduced to keep the power output of the motor 24 within the available power provided on the power bus 84. Consequently, the torque necessary to raise the dump box 20, for example, is generated by the motor 24, but at a lower motor speed than may have been commanded by the operator. If the power at the electric power source 28 drops further, a further adjusted power curve 110 shifted further down and to the left may be necessary.

Figure 4:
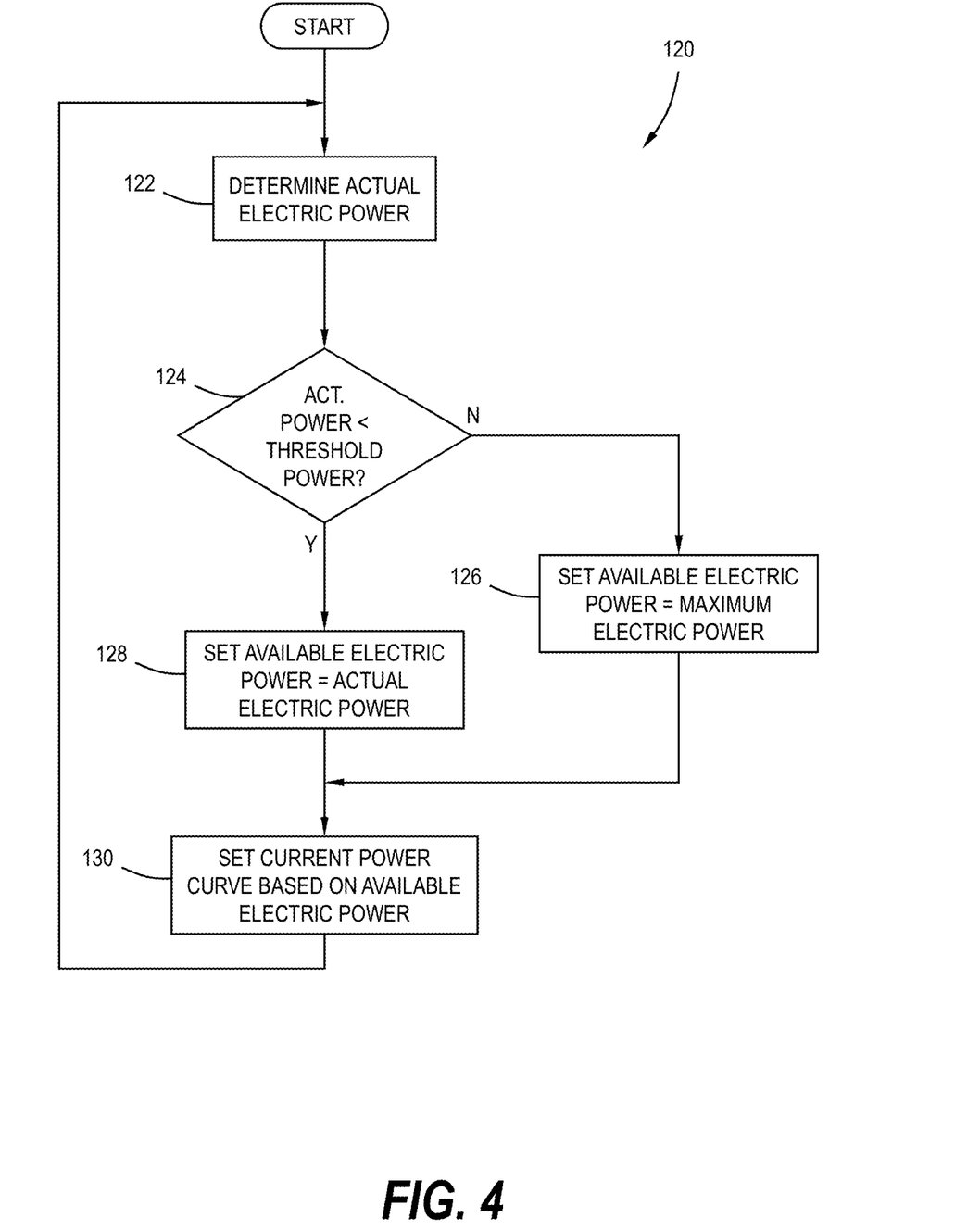
FIG. 4 is a flow diagram of an embodiment of a power curve selection routine in accordance with the present disclosure for the hydraulic system of FIG. 2.

Hydraulic load management in accordance with the present disclosure for systems such as the hydraulic system 18 may be implemented in the control strategy for the work machine 10 executed by the controllers 30, 34, 80. FIG. 4 illustrates a power curve selection routine 120 for evaluating the available electric power in the electric power source 28 and selecting a corresponding power curve to use for control of the motor 24 when a command is received from the operator. The routine 120 may begin at a block 122 where an actual electric power at the electric power source 28 is determined. In the present embodiment, the power source controller 30 may receive charge sensor signals from a charge sensor operatively connected to the electric power source 28. The power source controller 30 may be programmed to convert the value of the charge sensor signals to an actual electric power that is available at the electric power source 28.

After the actual electric power is determined at the block 122, control may pass to a block 124 to compare the actual available power to a threshold electric power. The threshold electric power may be an amount of power above which the electric power source 28 may be considered to be charged to full capacity for operations of the work machine 10 to be performed normally. In one embodiment, the power source controller 30 may transmit the actual electric power value to the main controller 34 to perform the comparison. If the actual electric power is not less than the threshold electric power at the block 124, control may pass to a block 126 where an available electric power is set to a maximum electric power and stored at the main controller 34. The maximum electric power may correspond to the full power curve 102 for the motor 24 operating at full capacity. If the actual electric power is less than the block 124, control may pass to a block 128 where the available electric power is set equal to he actual electric power of the electric power source 28.

After the available electric power is set at either the block 126 or the block 128, control may pass to a block 130 where a current power curve for the motor 24 is determined based on the value of the available electric power. If the available electric power is set to the maximum electric power, the current power curve may be set to the full power curve 102. Where the available electric power is less then the maximum electric power, various strategies may be used to set the current power curve from available electric power curves. In one embodiment, the power curves for the motor 24 may be stored in a look up table, with the available electric power being used to select a corresponding power curve from the table. In another embodiment, the current power curve may be set based on the percentage of ratio of the available electric power to the maximum electric power. The percentage or ration may be applied to reduce the full power curve to an appropriate reduced power curve for the available electric power. Those skilled in the art will understand that further alternative strategies for setting the current power curve based on the available electric power may be implemented and are contemplated by the inventors.

The processing of the block 130 may be performed at an appropriate location in the control architecture. In one embodiment, the main controller 34 may deterring the current power curve from the available electric power. The current power curve may be stored at the main controller 34 or passed on to the hydraulic system controller 80. In other embodiments, the available electric power may be passed to the hydraulic system controller 80 to determine the current power curve for the motor 24 of the hydraulic system 18. After the current power curve is determined at the block 130, control may pass back to the block 122 to detect the actual electric power and update the available electric power and current power curve as necessary.

Figure 5:
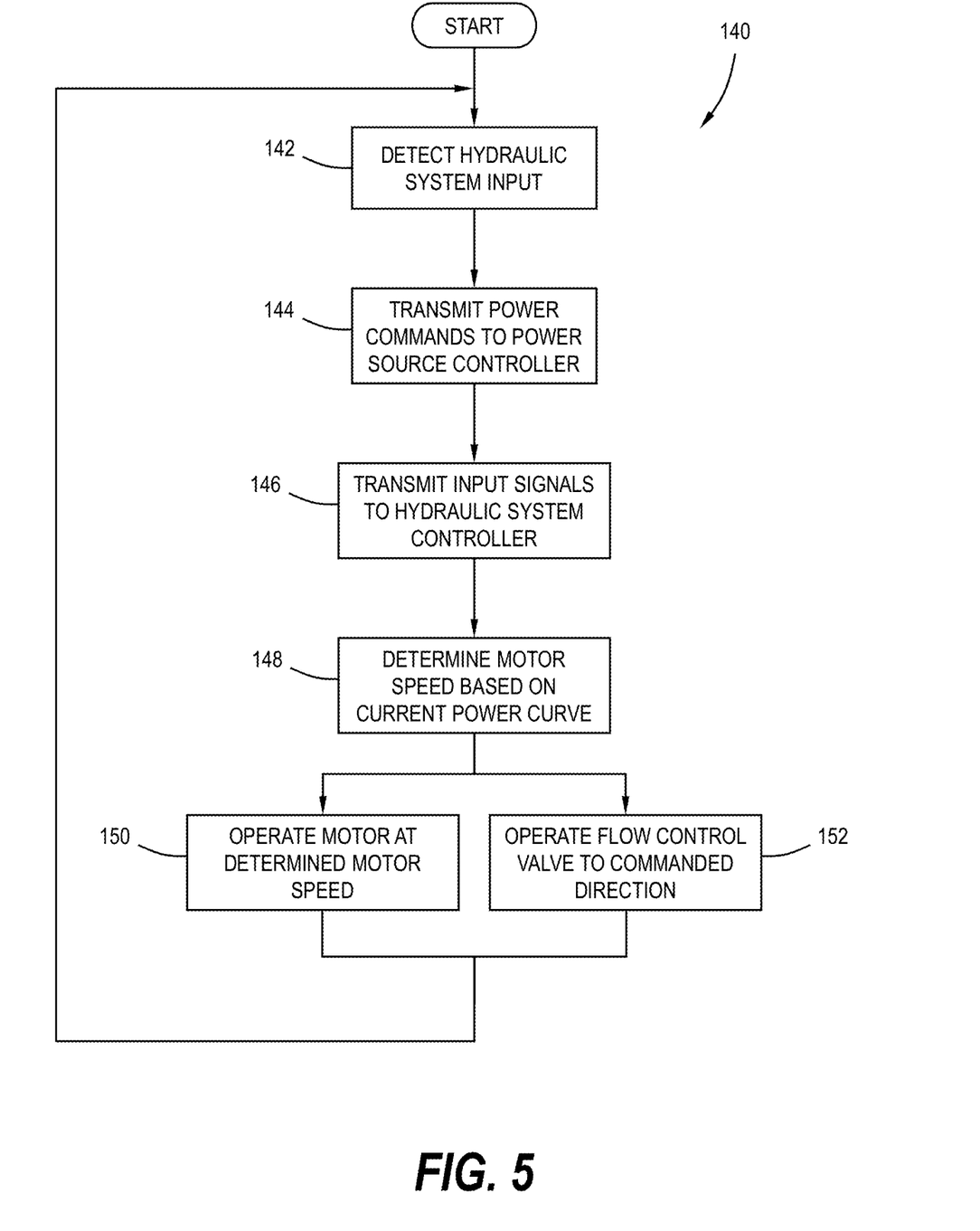
FIG. 5 is a flow diagram of an embodiment of a motor speed control routine in accordance with the present disclosure for the hydraulic system of FIG. 2.

With the current power curve determined at the routine 120, operation of the hydraulic system 18 may be managed to stay within the available electric power of the electric power source 28 to perform commanded operations without collapsing the power bus 82. FIG. 5 illustrates a hydraulic system operation routine 140 for responding to operator commands at the input device 82 based on the available electric power. The routine 140 may begin at block 142 where input for the hydraulic system 18 is detected. As discussed, displacement of the input device 82 by the operator may cause input signals with the commanded speed and commanded direction for moving the dump box 20 to be transmitted to the main controller 34. Upon receiving the input signals at the main controller 34 at the block 142, control may pass to a block 144 where the main controller 34 transmits power command signals to the power source controller 30 to cause the electric power source 28 to send electric power over the power bus 84 to the hydraulic system 18. After the power command signals are sent at the block 144, or contemporaneously therewith, control may pass to a block 146 where the input signals are transmitted by the main controller 34 to the hydraulic system controller 80.

After the input signals are received by the hydraulic system controller 80 at the block 146, control may pass to a block 148 where the hydraulic system controller determines a motor speed corresponding to the commanded speed based on the current power curve determined by the routine 120. If the current power curve is the full power curve 102, the hydraulic system 18 can operate normally and the motor speed may be set to move the dump box 20 at the commanded speed. However, if the current power curve is a power curve adjusted for less than maximum electric power at the electric power source 28, the motor speed is reduced by a corresponding amount. In one embodiment, a conversion table may be stored at the hydraulic system controller 80 that maps commanded speeds and the available power curves such that a table look up using the commanded speed and the current power curve returns the corresponding motor speed. In another embodiment, the full power curve may be used to determine the torque at the commanded speed under normal power conditions, and then the determined torque may be used to determine the corresponding motor speed on the current power curve. Additional methods for determining the motor speed based on the commanded speed and the current power curve will be apparent to those skilled in the art and are contemplated by the inventors.

After the motor speed is determined at the block 148, control may pass to a block 150 where the hydraulic system controller 80 transmits motor control signals to cause the motor 24 to operate at the determined motor speed under the electric power provided on the power bus 84, and to a block 152 where the hydraulic system controller 80 transmits valve control signals to the flow control valve 68 to move to the position corresponding to the commanded direction to either extend or retract the hydraulic actuator 50. Because the motor speed was determined based on the current power curve that was determined based on the available electric power, the motor 24 should operate at the motor speed without the output power exceeding the available electric power and causing the power bus 84 to collapse. After the motor 24 is operating at the block 150 and the flow control valve 68 is move into position at the block 152, control may pass back to the block 142 to detect subsequent input commands from the operator at the control device 82.

INDUSTRIAL APPLICABILITY

The hydraulic load management strategy in accordance with the present disclosure allows a work machine 10 to maintain its primary functions that are hydraulic systems that rely on electric power, which can include steering, braking and load dumping among other systems. Rather than taking electric powered pump motors completely offline, or operating the motors normally and risking collapsing the power bus 84, the motors may be operated at reduced speeds that are commensurate with the available electric power from the electric power source 28. The motors 24 and the electric power source 28 are enabled to stay online in lower power capability conditions. In mining trucks such as the work machine 10 illustrated and described herein, the hydraulic load management strategy provides the ability to dump load from a mining truck with an undercharged or damaged battery. This enables the mining truck to subsequently be serviced with the dump box 20 raised, which is a common requirement to service a mining truck.

Hydraulic load management as disclosed herein may be implemented in any work machine where electrical power sources such as batteries are used to power electric motors to perform work, but may experience conditions where the power available from the power source is insufficient to meet the needs of the work machine. Such work machines can include excavation equipment as disclosed herein, marine vehicles, gensets and the like. Additionally, as discussed above, variations on the control system architecture are contemplated. For example, the functionality of the controllers 30, 34, 80 may be combined on a single control device, or distributed in a different manner between multiple control devices to long as hydraulic load management in accordance with the present disclosure is performed.

While the exemplary embodiments relate to battery-powered work machines, hydraulic load management in accordance with the present disclosure is not limited to application in battery-powered work machines. Diesel-powered work machines could use electric motors to run the hydraulic systems and implement the hydraulic load management strategy. Any time an electric motor is used to power a hydraulic system having both high torque and high speed requirements could use hydraulic load management as disclosed herein where the electric motor may be able to deliver either high torque or high speed but not both at the same time due to faults or other power limits from and engine or an electrical system that powers the motor.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A work machine comprising:
   a hydraulic pump;
   an electric motor operatively coupled to the hydraulic pump;
   an electric power source;
   a power bus connecting the electric power source to the electric motor to transmit electric power from the electric power source to the electric motor; and
   a controller operatively connected to the electric motor and the electric power source, the controller configured to:
      determine an actual electric power stored at the electric power source,
      compare the actual electric power to a threshold electric power, and
      set a value for an available electric power for the electric power source based on the comparison of the actual electric power to the threshold electric power,
      set the value for the available electric power equal to a maximum electric power in response to determining that the actual electric power is not less than the threshold electric power, and
      set a current power curve equal to a full power curve in response to determining that the available electric power is equal to the maximum electric power.

2. The work machine of claim 1, wherein the controller is configured to set a current power curve equal to an adjusted power curve in response to determining that the available electric power is less than a maximum electric power.

3. The work machine of claim 1, wherein the controller is configured to set the value for the available electric power equal to the actual electric power in response to determining that the actual electric power is less than the threshold electric power.

4. The work machine of claim 3, wherein the controller is configured to set a current power curve equal to an adjusted power curve in response to determining that the available electric power is equal to the actual electric power.

5. The work machine of claim 1, wherein the controller is configured to set a current power curve based on the value of the available electric power.

6. The work machine of claim 5, comprising a hydraulic actuator in fluid communication with the hydraulic pump, where the electric motor, the hydraulic pump and the hydraulic actuator are components of a hydraulic system of the work machine, and wherein the controller is configured to:
   detect a hydraulic system input to actuate the hydraulic actuator, wherein the hydraulic system input comprises a commanded speed;
   cause the electric power source to transmit electric power to the electric motor via the power bus;
   determine a motor speed for the electric motor based on the current power curve and the commanded speed; and
   cause the electric motor to operate at the determined motor speed.

7. The work machine of claim 6, wherein the hydraulic system comprises a flow control valve fluidly connected between the hydraulic pump and the hydraulic actuator and operatively connected to the controller, wherein the hydraulic system input comprises a commanded direction, and wherein the controller is configured to cause the flow control valve to move to a position to cause hydraulic fluid from the hydraulic pump to move the hydraulic actuator in the commanded direction.

8. A method for hydraulic load management of an electric motor driven hydraulic system of a work machine, wherein the hydraulic system includes both a hydraulic pump operatively coupled to the electric motor and a hydraulic actuator in fluid communication with the hydraulic pump, and wherein a power bus connects an electric power source of the work machine to the electric motor to transmit electric power from the electric power source to the electric motor, the method comprising:
   determining an actual electric power stored at the electric power source;
   comparing the actual electric power to a threshold electric power for operating the electric motor at a full capacity;
   setting a value for an available electric power for the electric power source based on the comparison of the actual electric power to the threshold electric power;
   setting a current power curve based on the value of the available electric power;
   detecting a hydraulic system input to actuate the hydraulic actuator, wherein the hydraulic system input comprises a commanded speed;
   causing the electric power source to transmit electric power to the electric motor via the power bus;
   determining a motor speed for the electric motor based on the current power curve and the commanded speed; and
   causing the electric motor to operate at the determined motor speed.

9. The method of claim 8, comprising setting the value for the available electric power equal to a maximum electric power in response to determining that the actual electric power is not less than the threshold electric power.

10. The method of claim 9, comprising setting a current power curve equal to a full power curve in response to determining that the available electric power is equal to the maximum electric power.

11. The method of claim 9, comprising setting a current power curve equal to an adjusted power curve in response to determining that the available electric power is less than a maximum electric power.

12. The method of claim 8, comprising setting the value for the available electric power equal to the actual electric power in response to determining that the actual electric power is less than the threshold electric power.

13. The method of claim 12, comprising setting a current power curve equal to an adjusted power curve in response to determining that the available electric power is equal to the actual electric power.

14. The method of claim 8, wherein the hydraulic system includes a flow control valve fluidly connected between the hydraulic pump and the hydraulic actuator and operatively connected to the controller, and wherein the hydraulic system input comprises a commanded direction, the method comprising causing the flow control valve to move to a position to cause hydraulic fluid from the hydraulic pump to move the hydraulic actuator in the commanded direction.

15. A controller for a work machine having a hydraulic system including a hydraulic pump, an electric motor operatively coupled to the hydraulic pump, and a hydraulic actuator fluidly connected to the hydraulic pump, the work machine further including an electric power source and a power bus connecting the electric power source to the electric motor to transmit electric power from the electric power source to the electric motor, where the controller is configured to:
   determine an actual electric power stored at the electric power source;
   compare the actual electric power to a threshold electric power;
   set a value for an available electric power for the electric power source based on the comparison of the actual electric power to the threshold electric power;
   set a current power curve based on the value of the available electric power;
   detect a hydraulic system input to actuate the hydraulic actuator, wherein the hydraulic system input comprises a commanded speed;
   cause the electric power source to transmit electric power to the electric motor via the power bus;
   determine a motor speed for the electric motor based on the current power curve and the commanded speed; and
   cause the electric motor to operate at the determined motor speed.

16. The controller of claim 15, wherein the controller is configured to:
   set the value for the available electric power equal to the actual electric power in response to determining that the actual electric power is less than the threshold electric power; and
   set the current power curve equal to an adjusted power curve in response to determining that the available electric power is less than a maximum electric power.

* * * * *